(12) United States Patent
Dapo et al.

(10) Patent No.: US 7,268,996 B1
(45) Date of Patent: *Sep. 11, 2007

(54) ELECTROLYTE FOR VERY HIGH VOLTAGE ELECTROLYTIC CAPACITORS

(75) Inventors: Roland Francis Dapo, Asheville, NC (US); Christopher Feger, Easley, SC (US)

(73) Assignee: Pacesetter, Inc., Sunnyvale ( * ) Notice: Subject to any disclaimer, the term of this patent is extended or adjusted under 35 U.S.C. 154(b) by 891 days.

This patent is subject to a terminal disclaimer.

(21) Appl. No.: 10/340,051

(22) Filed: Jan. 10, 2003

(51) Int. Cl.
 *H01G 9/00* (2006.01)

(52) U.S. Cl. ............... 361/503; 361/505; 361/508; 361/516; 361/519; 361/523; 361/525; 252/62.2

(58) Field of Classification Search ........ 361/502–512, 361/516–534; 29/25.03; 252/62.2; 607/5, 607/7
See application file for complete search history.

(56) References Cited

U.S. PATENT DOCUMENTS

| | | | |
|---|---|---|---|
| 4,518,471 A | 5/1985 | Arora | 204/129.1 |
| 4,525,249 A | 6/1985 | Arora | 204/129.75 |
| 4,860,169 A | 8/1989 | Dapo | 361/506 |
| 5,131,388 A | 7/1992 | Pless et al. | 128/419 D |
| 5,496,481 A | 3/1996 | Liu | 252/62.2 |
| 5,522,851 A | 6/1996 | Fayram | 607/5 |
| 5,715,133 A | 2/1998 | Harrington et al. | 361/500 |
| 6,058,006 A * | 5/2000 | Yoshioka et al. | 361/511 |
| 6,128,179 A * | 10/2000 | Morokuma | 361/517 |
| 6,307,735 B1 * | 10/2001 | Saito et al. | 361/517 |
| 6,349,028 B1 * | 2/2002 | Komatsu | 361/504 |
| 6,587,329 B1 * | 7/2003 | Feger | 361/504 |
| 6,743,370 B1 * | 6/2004 | Feger et al. | 361/504 |

* cited by examiner

*Primary Examiner*—Nguyen T. Ha
(74) *Attorney, Agent, or Firm*—Steven M. Mitchell

(57) ABSTRACT

The present invention is directed to an electrolyte for use in very high voltage electrolytic capacitors and to an electrolytic capacitor impregnated with the electrolyte of the present invention for use in an implantable cardioverter defibrillator (ICD). The electrolyte according to the present invention is composed of a mixture of an alkoxy-substituted alcohol, such as 2-methoxyethanol, 2-ethoxyethanol, or 2-butoxyethanol, and a long chain dicarboxylic acid, where the acid functional groups are separated by 34 carbons (referred to as "dimer acid") or 54 carbons (referred to as "trimer acid"). The solution is then neutralized with ammonium hydroxide or other amine, such as ammonia, dimethylamine, trimethylamine, diethylamine, triethylamine, ethanolamine, diethanolamine, triethanolamine, diisopropylethylamine and N-methylimidazole. Additional cosolvents, such as ethylene glycol, 1,2-propanediol, 1,3-butanediol, 1,4-butanediol, di(ethylene glycol), tri(ethylene glycol), tetra(ethylene glycol), propyl alcohol, isopropyl alcohol, n-butanol, and di(ethylene glycol) butyl ether, may be added. Also, a cathode depolarizer, or degassing agent, from the group of nitro-substituted aromatic compounds (nitroaromatics) can be added to reduce the amount of gas produced during capacitor life.

28 Claims, No Drawings

ELECTROLYTE FOR VERY HIGH VOLTAGE ELECTROLYTIC CAPACITORS

BACKGROUND OF THE INVENTION

1. Field of the Invention

The present invention is directed to an electrolyte for very high voltage electrolytic capacitors and to an electrolytic capacitor impregnated with the electrolyte of the present invention for use in an implantable cardioverter defibrillator (ICD).

2. Related Art

Compact, high voltage capacitors are utilized as energy storage reservoirs in many applications, including implantable medical devices. These capacitors are required to have a high energy density since it is desirable to minimize the overall size of the implanted device. This is particularly true of an Implantable Cardioverter Defibrillator (ICD), also referred to as an implantable defibrillator, since the high voltage capacitors used to deliver the defibrillation pulse can occupy as much as one third of the ICD volume.

Implantable Cardioverter Defibrillators, such as those disclosed in U.S. Pat. No. 5,131,388, incorporated herein by reference, typically use two electrolytic capacitors in series to achieve the desired high voltage for shock delivery. Electrolytic capacitors are used in ICDs because they have the most nearly ideal properties in terms of size, reliability and ability to withstand relatively high voltage. Conventionally, such electrolytic capacitors include an etched aluminum foil anode, an aluminum foil or film cathode, and an interposed kraft paper or fabric gauze separator impregnated with a solvent-based liquid electrolyte. While aluminum is the preferred metal for the anode plates, other metals such as tantalum, magnesium, titanium, niobium, zirconium and zinc may be used. A typical solvent-based liquid electrolyte may be a mixture of a weak acid and a salt of a weak acid, preferably a salt of the weak acid employed, in a polyhydroxy alcohol solvent. The electrolytic or ion-producing component of the electrolyte is the salt that is dissolved in the solvent. The entire laminate is rolled up into the form of a substantially cylindrical body, or wound roll, that is held together with adhesive tape and is encased, with the aid of suitable insulation, in an aluminum tube or canister. Connections to the anode and the cathode are made via tabs. Alternative flat constructions for aluminum electrolytic capacitors are also known, comprising a planar, layered, stack structure of electrode materials with separators interposed therebetween, such as those disclosed in the above-mentioned U.S. Pat. No. 5,131,388.

In ICDs, as in other applications where space is a critical design element, it is desirable to use capacitors with the greatest possible capacitance per unit volume. Since the capacitance of an electrolytic capacitor is provided by the anodes, a clear strategy for increasing the energy density in the capacitor is to minimize the volume taken up by paper and cathode and maximize the number of anodes. A multiple anode stack configuration requires fewer cathodes and paper spacers than a single anode configuration and thus reduces the size of the device. A multiple anode stack consists of a number of units consisting of a cathode, a paper spacer, two or more anodes, a paper spacer and a cathode, with neighboring units sharing the cathode between them. Energy storage density can be increased by using a multiple anode element, however, the drawback is that the equivalent series resistance, ESR, of the capacitor increases as the conduction path from cathode to anode becomes increasingly tortuous.

Typically, an implantable cardioverter defibrillator may utilize two 350 to 400 volt electrolytic capacitors in series to achieve a voltage of 700 to 800 volts. However, for greater ease of construction and a thinner ICD, a single capacitor unit is preferred. Accordingly, the need for a capacitor with a working voltage of greater than 400 volts becomes pronounced. Commercial capacitors rated to 600 volts can be obtained but generally suffer from high equivalent series resistance (ESR) due to low electrolyte conductivity. In addition, capacitors with voltage ratings in excess of 700 volts are not available.

There are numerous commercially available compositions of electrolyte for use in electrolytic capacitors that can conform to reasonable specifications, as long as the operating voltage of the capacitor remains at 400 volts or lower. However, once this limit is exceeded, the choices become more limited. There are relatively few electrolytes for this voltage regime, and the suitable electrolytes known in the art have several drawbacks, especially when used in a flat, stacked capacitor having a multiple anode configuration. First, glycol-based electrolytes suffer from relatively poor conductivity and ionic mobility. These electrolytes will produce a capacitor with significant energy loss due to a higher than acceptable equivalent series resistance (ESR). Second, γ-butyrolactone based electrolytes, which overcome the problems of ionic mobility, can not be used in conjunction with typical paper spacer pads. These require thicker, more expensive pads made out of manila fibers, and as a result of greater thickness, sharply reduce the energy density in flat stacked capacitor designs. Many high voltage electrolytes employ the use of very long chain dicarboxylic acids and large bases to achieve the necessary breakdown voltages, however, the resultant electrolytes have very low conductivities ($\leq 1$ mS/cm). For example, U.S. Pat. No. 4,860,169 discloses an electrolytic capacitor for use in operation at voltages above 500 volts, produced by employing an electrolyte containing a straight chain saturated aliphatic dicarboxylic acid in which the carboxylic moieties are separated by at least 14 carbon atoms in a mixture of at least one polar organic solvent and water. The disclosed composition has a resistivity at 30° C. of 1280 Ω·cm (781 µS/cm), a pH of 9.68 and Scintillation voltage of 500 V.

What is needed in the art is an electrolyte that provides acceptable breakdown characteristics with reasonable conductivity when impregnated in an electrolytic capacitor operating above 700 volts.

SUMMARY OF THE INVENTION

The present invention is directed to a conductive electrolyte for use in very high voltage electrolytic capacitors and to an electrolytic capacitor impregnated with the electrolyte of the present invention for use in an implantable cardioverter defibrillator (ICD). The electrolyte according to the present invention is composed of a primary solvent, preferably an alkoxy-substituted alcohol, such as 2-methoxyethanol, 2-ethoxyethanol, or 2-butoxyethanol, and an organic acid, preferably a dicarboxylic acid where the acid functional groups are separated by 34 carbons (commonly referred to as "dimer acid," as disclosed in U.S. Pat. No. 5,496,481, incorporated herein by reference) or a dicarboxylic acid where the acid functional groups are separated by 54 carbons (commonly referred to as "trimer acid," as disclosed in U.S. Pat. No. 5,496,481, incorporated herein by reference). The solution is then neutralized with ammonium hydroxide (28-30% in water) or other amine such as ammonia, dimethylamine, trimethylamine, diethylamine, triethylamine, ethanolamine, diethanolamine, triethanolamine, diisopropylethylamine and N-methylimidazole, to provide more reasonable conductivity. The electrolyte may also have one or more cosolvents such as ethylene glycol, 1,2-propanediol, 1,3-butanediol, 1,4-butanediol, di(ethylene glycol), tri(ethylene glycol), tetra(ethylene glycol), propyl alcohol, isopropyl alcohol, n-butanol, and di(ethylene glycol) butyl ether. Also, a cathode depolarizer, or degassing agent, selected from the group of nitro-substituted aromatic compounds (nitroaromatics), including nitrobenzene, nitrotoluene, nitrophenol, nitroacetophenone, nitrobenzyl alcohol, and nitroanisole, can be added to reduce the amount of gas produced during capacitor life.

A representative composition according to the present invention that displays the desired properties is:

50.0% by weight 2-methoxyethanol;
23.0% by weight di(ethylene glycol);
25.0% by weight dimer acid; and
2.0% by weight ammonium hydroxide.

The electrolyte according to the present invention, when impregnated in an electrolytic capacitor, can be expected to withstand voltages in excess of 750 volts and do so with reasonable resultant ESR due to high bulk conductivity and low viscosity.

DETAILED DESCRIPTION OF THE INVENTION

The present invention is directed to an electrolyte for very high voltage electrolytic capacitors and to an electrolytic capacitor impregnated with the electrolyte of the present invention for use in an implantable cardioverter defibrillator (ICD). The electrolyte according to the present invention can be expected to withstand voltages in excess of 750 volts, allowing for the possibility of a defibrillator that has a single capacitor unit, rather than the two or more individual capacitors presently employed, capable of operating above 700 volts.

Preferred embodiments of the present invention are now described. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

The electrolyte according to the present invention is composed of a primary solvent, preferably an alkoxy-substituted alcohol, such as 2-methoxyethanol, 2-ethoxyethanol, or 2-butoxyethanol, and an organic acid, preferably a dicarboxylic acid where the acid functional groups are separated by at least 34 carbons, such as a dicarboxylic acid where the acid functional groups are separated by 34 carbons (commonly referred to as "diner acid") (as disclosed in U.S. Pat. No. 5,496,481, incorporated herein by reference), such as is available from Sigma-Aldrich under the product number 43, 236-9 ("hydrogenated dimer acid"), or a dicarboxylic acid where the acid functional groups are separated by 54 carbons (commonly referred to as "trimer acid") (as disclosed in U.S. Pat. No. 5,496,481, incorporated herein by reference). The solution is then neutralized with ammonium hydroxide (28-30% in water) or other amine such as ammonia, dimethylamine, trimethylamine, diethylamine, triethylamine, ethanolamine, diethanolamine, triethanolamine, diisopropylethylamine and N-methylimidazole, to provide more reasonable conductivity. The electrolyte may also have one or more cosolvents such as ethylene glycol, 1,2-propanediol, 1,3-butanediol, 1,4-butanediol, di(ethylene glycol), tri(ethylene glycol), tetra(ethylene glycol), propyl alcohol, isopropyl alcohol, n-butanol, and di(ethylene glycol) butyl ether. Also, a cathode depolarizer, or degassing agent, selected from the group of nitro-substituted aromatic compounds (nitroaromatics), including nitrobenzene, nitrotoluene, nitrophenol, nitroacetophenone, nitrobenzyl alcohol, and nitroanisole, can be added to reduce the amount of gas produced during capacitor life.

The electrolyte according to the present invention can be composed of the following ranges of components: about 30.0% to about 80.0% by weight of an alkoxy-substituted alcohol, such as 2-methoxyethanol, 2-ethoxyethanol, or 2-butoxyethanol, about 0% to about 50.0% by weight of a first cosolvent, such as ethylene glycol, about 0% to about 30% by weight of a second cosolvent, such as di(ethylene glycol), about 0% to about 30% by weight of a third cosolvent, such as 1,2-propanediol, about 5.0% to about 40% by weight dimer or trimer acid, about 0% to about 6% by weight ammonium hydroxide or other amine, and about 0% to about 3% by weight of a cathode depolarizer. Water may also be added to the electrolyte, preferably in a concentration of about 0% to about 8% by weight.

In a preferred embodiment, the electrolyte according to the present invention is composed of the following ranges of components: about 35.0% to about 75.0% by weight of an alkoxy-substituted alcohol, about 5.0% to about 40.0% by weight of a cosolvent, about 20.0% to about 35% by weight diner or trimer acid, about 2.0% to about 4.0% by weight ammonium hydroxide or other amine, and about 0% to about 3% by weight of a cathode depolarizer.

A representative composition according to the present invention that displays the desired properties is 50.0% by weight 2-methoxyethanol, 23.0% by weight di(ethylene glycol), 25.0% by weight dimer or trimer acid and 2.0% by weight ammonium hydroxide. An exemplary electrolyte made according to this representative composition exhibited a pH of 7.3 and conductivity of 829 µS/cm at 37° C. A cylindrical capacitor with a single layer 840 EFV (effective formation voltage) anode was aged to 760 V without any evidence of voltage breakdown.

In one embodiment, an electrolytic capacitor according to the present invention is constructed of anode and cathode layers, stacked with a paper insulator or spacer between each layer. The anode layer is composed of one or more anode foils stacked together without any paper spacer, to form a high energy density anode element. The anode and cathode layers are then grouped together in a parallel connection to produce sufficient capacitance for the intended function. This finished stack is inserted into a case with a geometry closely following the contour of the stack, and designed to minimize the space occupied inside the finished defibrillator. In an alternative embodiment, a wound roll configuration may also be used, as would be apparent to those skilled in the relevant art.

Aluminum foil is preferred for the anode and cathode layers, because of its ability to produce a sufficient quality oxide layer, its conductive properties, and its wide commercial availability. Other valve metal foils conventionally utilized in electrolytic capacitors could also be used, including titanium, tantalum, magnesium, niobium, zirconium and zinc. Preferably, a strip of unetched, high purity (99.99%) aluminum foil with high cubicity, wherein at least 85% of the crystalline aluminum structure is oriented in a normal position (i.e., a (1,0,0) orientation) relative to the surface of the foil, is used. Such foils are well-known in the art and are readily available from commercial sources known to those skilled in the art.

In a preferred embodiment, the anode foil may be etched in an aqueous halide based etch solution, typically a hydrochloric acid or sodium chloride solution, according to a conventional etch process, for example, U.S. Pat. No. 5,715,133 describes a suitable method of etching foil and is incorporated herein by reference in its entirety. The etch solution preferably consists of about 1.3% by weight sodium chloride, about 3.5% by weight sodium perchlorate, about 0.35% sodium persulfate, and deionized water. The etch solution preferably is heated to about 60° C. to about 95° C., more preferably 85° C. The foil is etched at a DC current density of about 0.01 A/cm$^2$ to about 0.30 A/cm$^2$, preferably 0.15 A/cm$^2$. A charge of about 20 coulombs/cm$^2$ to about 100 coulombs/cm$^2$ is passed through the foil during the etching process, with about 50 coulombs/cm$^2$ preferred, which requires a time of about 2 minutes and 13 seconds to about 11 minutes and 7 seconds, with about 5 minutes and 30 seconds preferred.

The foil is then removed from the etch solution and rinsed in deionized water. In a preferred embodiment, the tunnels formed during the initial etch are widened, or enlarged, in a secondary etch solution, typically an aqueous based nitrate solution, preferably between about 1% to about 20% aluminum nitrate, more preferably between about 10% to about 14% aluminum nitrate, with less than about 1% free nitric acid. The etch tunnels are widened to an appropriate diameter by methods known to those in the art, such as that disclosed in U.S. Pat. No. 4,518,471 and U.S. Pat. No. 4,525,249, entirely incorporated herein by reference.

After the etch tunnels have been widened, the foil is again rinsed with deionized water and dried. Finally, in a preferred embodiment, a barrier oxide layer may be formed onto one or both surfaces of the metal foil by placing the foil into an electrolyte bath and applying a positive voltage to the metal foil and a negative voltage to the electrolyte. The barrier oxide layer provides a high resistance to current passing between the electrolyte and the metal foils in the finished capacitor, also referred to as the leakage current. A high leakage current can result in the poor performance and reliability of an electrolytic capacitor. In particular, a high leakage current results in greater amount of charge leaking out of the capacitor once it has been charged.

The formation process consists of applying a voltage to the foil through an electrolyte such as boric acid and water or other solutions familiar to those skilled in the art, resulting in the formation of an oxide on the surface of the anode foil. The preferred electrolyte for formation is a 100-1000 µS/cm, preferably 500 µS/cm, citric acid concentration. In the case of an aluminum anode foil, the formation process results in the formation of aluminum oxide ($Al_2O_3$) on the surface of the anode foil. The thickness of the oxide deposited or "formed" on the anode foil is proportional to the applied voltage, roughly 10 to 15 Angstroms per applied volt.

The etched and formed anode foils are cut and the capacitor assembled as discussed above. An electrolytic capacitor stack according to the present invention consists of a number of units of: cathode, a paper spacer, one or more anodes, a paper spacer and cathode, with neighboring units sharing the cathode between them.

The electrolyte of the present invention is then prepared. In one embodiment, initially, the alkoxy-substituted alcohol solvent and dimer or trimer acid are mixed at room temperature until the dimer or trimer acid dissolves completely.

Then the ammonium hydroxide or other amine is added and allowed to stir completely. In a further embodiment, one or more cosolvents and/or a cathode depolarizer may be added to the initial alkoxy-substituted alcohol and dimer/trimer acid mix prior to the ammonium hydroxide or other amine.

The pre-assembled capacitor is then impregnated with the electrolyte of the present invention, preferably by placing the capacitor in contact with the electrolyte and reducing the pressure to less than 50 cm Hg. The capacitor is held at this low pressure for about 5 minutes to about 45 minutes with a preferred time of about 15 minutes, and then pressure is restored, using the pressure to force the electrolyte mixture into the capacitor stack. The capacitor is then removed and placed in an oven at a temperature of about 65° C. to about 90° C. with a preferred temperature of about 90° C. and a maximum oxygen atmospheric concentration of about 2% for a period of about 2 hours to about 24 hours, with a preferred time of about 4 hours. The capacitor is then aged in a normal manner by applying the working voltage to the capacitor, allowing the capacitor to reach this voltage, and then allowing the current to decrease.

Electrolytic capacitors according to the present invention can be incorporated into implantable medical devices, such as implantable cardioverter defibrillators (ICDs), as would be apparent to one skilled in the art, as described in U.S. Pat. No. 5,522,851.

Having now generally described the invention, the same will be more readily understood through reference to the following examples which are provided by way of illustration, and are not intended to be limiting of the present invention.

EXAMPLES

Example 1

An electrolyte was prepared having the following formulation:

| | |
|---|---|
| 2-Methoxyethanol | 108.0 g |
| Dimer Acid | 37.5 g |
| Ammonium hydroxide | 4.5 g |

The 2-methoxyethanol and dimer acid were mixed at room temperature until the dimer acid dissolved. The ammonium hydroxide was then added and allowed to stir thoroughly.

The resultant electrolyte exhibited a pH of 7.54 and a conductivity of 695 µS/cm at 30.0° C. Water was then added to achieve a Karl Fischer titration (water content) measurement of 2.35%. A pH of 7.18, a conductivity of 874 µS/cm and an open cup scintillation voltage of 546 V were observed at 36.1° C.

Slide capacitors composed of a 1"×3" glass slide sandwich consisting of either a single or a double layer anode interleaved between three 0.25 mil Kraft paper spacers and a conventional cathode (having a cathode-papers-anode(s)-papers-cathode arrangement) were impregnated with the prepared electrolyte. The single anode capacitor exhibited a capacitance of 3.1125 µF, an ESR of 35.53Ω and a breakdown voltage of 672 V. When employed in a dual-anode layer capacitor arrangement, the capacitor obtained a capacitance of 4.0790 µF and an ESR of 125.2Ω. An average viscosity of 6.64 cP and an index of refraction, $n_D$ (20° C.), of 1.4255 were observed for the prepared electrolyte.

Example 2

In a similar experiment, an electrolyte was prepared having the following formulation:

| | |
|---|---|
| 2-Methoxyethanol | 576.0 g |
| Dimer Acid | 200.0 g |
| Ammonium hydroxide | 24.0 g |

The 2-methoxyethanol and dimer acid were mixed at room temperature until the dimer acid dissolved. The ammonium hydroxide was then added and allowed to stir thoroughly. The resultant electrolyte exhibited a pH of 8.04 and a conductivity of 1.160 mS at 37.0° C.

Capacitor sections were prepared by impregnating a paper spacer, separated by aluminum anode and aluminum cathode members, with the electrolyte composition of the example, and the electrolyte composition was evaluated in regard to the aging or "burn in" of the capacitor sections treated with them. The aging procedure involved applying a current of 2 mA per unit in a constant current mode, the maximum voltage applied to these capacitors was 760 V at room temperature. After aging, the units were allowed to cool and stand for 24 hours and the leakage current, capacitance and ESR were determined. The capacitors made from the compositions exhibited a capacitance of 163.57 µF, an ESR of 995.2 mΩ, a leakage current after 1 minute of 7.59 mA and a leakage current after 5 minutes of 3.60 mA.

Example 3

An electrolyte was prepared having the following formulation:

| | |
|---|---|
| Ethylene Glycol | 12.0 g |
| 2-Methoxyethanol | 96.0 g |
| Dimer Acid | 37.6 g |
| Ammonium hydroxide | 3.0 g |

The ethylene glycol, 2-methoxyethanol and dimer acid were mixed at room temperature and stirred thoroughly. The ammonium hydroxide was then added and allowed to stir completely.

The resultant electrolyte exhibited a pH of 7.15 and a conductivity of 630 µS/cm at 25.4° C. Water was then added to achieve a Karl Fischer titration (water content) measurement of 1.57%. A pH of 7.10, a conductivity of 942 µS/cm and an open CLIP scintillation voltage of 540V were observed at 37.7° C.

Slide capacitors composed of a 1"×5", glass slide sandwich consisting of either a single or a double layer anode interleaved between three 0.25 mil Kraft paper spacers and a conventional cathode (having a cathode-papers-anode(s)-papers-cathode arrangement) were impregnated with the prepared electrolyte. The single anode capacitor exhibited a capacitance of 3.1778 µF, an ESR of 34.63Ω and a breakdown voltage of greater than 750 V. When employed in a dual-anode layer capacitor arrangement, the capacitor obtained a capacitance of 4.4936 µF and an ESR of 121.8Ω. An average viscosity of 7.61 cP and an index of refraction, $n_D$ (20° C.), of 1.4276 were observed for the prepared electrolyte.

Example 4

In a similar experiment, an electrolyte was prepared having the following formulation:

| | |
|---|---|
| Ethylene Glycol | 296.0 g |
| 2-Methoxyethanol | 288.0 g |
| Dimer Acid | 200.0 g |
| Ammonium hydroxide | 16.0 g |

The ethylene glycol, 2-methoxyethanol and dimer acid were mixed at room temperature and stirred thoroughly. The ammonium hydroxide was then added and allowed to stir completely. The resultant electrolyte exhibited a pH of 7.08 and a conductivity of 1.56 mS at 37° C.

Capacitor sections were prepared by impregnating a paper spacer, separated by aluminum anode and aluminum cathode members, with the electrolyte composition of the example, and the electrolyte composition was evaluated in regard to the aging of the capacitor sections treated with them. The aging procedure involved applying a current of 2 mA per unit in a constant current mode, the maximum voltage applied to these capacitors was 760 V at room temperature. After aging, the units were allowed to cool and stand for 24 hours and the leakage current, capacitance and ESR were determined. The capacitors made from the compositions exhibited a capacitance of 162.71 µF, an ESR of 656.0 mΩ, a leakage current after 1 minute of 4.47 mA and a leakage current after 5 minutes of 1.70 mA.

Example 5

In a similar experiment, an electrolyte was prepared having the following formulation:

| | |
|---|---|
| Ethylene Glycol | 184.0 g |
| 2-Methoxyethanol | 400.0 g |
| Dimer Acid | 200.0 g |
| Ammonium hydroxide | 16.0 g |

The ethylene glycol, 2-methoxyethanol and dimer acid were mixed at 65° C. and stirred thoroughly. The ammonium hydroxide was then added and allowed to stir completely. The resultant electrolyte exhibited a pH of 7.15 and a conductivity of 1.47 mS at 37° C.

Capacitor sections were prepared by impregnating a paper spacer, separated by aluminum anode and aluminum cathode members, with the electrolyte composition of the example, and the electrolyte composition was evaluated in regard to the aging of the capacitor sections treated with them. The aging, procedure involved applying a current of 2 mA per unit in a constant current mode, the maximum voltage applied to these capacitors was 760 V at room temperature. After aging, the units were allowed to cool and stand for 24 hours and the leakage current, capacitance and ESR were determined. The capacitors made from the compositions exhibited a capacitance of 162.52 µF, an ESR of 827.6 mΩ, a leakage current after 1 minute of 3.50 mA and a leakage current after 5 minutes of 1.60 mA.

Example 6

In a similar experiment, an electrolyte was prepared having the following formulation:

| | |
|---|---|
| Ethylene Glycol | 72.0 g |
| 2-Methoxyethanol | 512.0 g |
| Dimer Acid | 200.0 g |
| Ammonium hydroxide | 16.0 g |

The ethylene glycol, 2-methoxyethanol and dimer acid were mixed at room temperature and stirred thoroughly. The ammonium hydroxide was then added and allowed to stir completely. The resultant electrolyte exhibited a pH of 7.46 and a conductivity of 1.14 mS at 37° C.

Capacitor sections were prepared by impregnating a paper spacer, separated by aluminum anode and aluminum cathode members, with the electrolyte composition of the example, and the electrolyte composition was evaluated in regard to the aging of the capacitor sections treated with them. The aging procedure involved applying a current of 2 mA per unit in a constant current mode, the maximum voltage applied to these capacitors was 760 V at room temperature. After aging, the units were allowed to cool and stand for 24 hours and the leakage current, capacitance and ESR were determined. The capacitors made from the compositions exhibited a capacitance of 162.65 µF, an ESR of 1.117Ω, a leakage current after 1 minute of 2.87 mA and a leakage current after 5 minutes of 1.54 mA.

Example 7

An electrolyte was prepared having the following formulation:

| | |
|---|---|
| 1,2-Propanediol | 34.5 g |
| 2-Methoxyethanol | 75.0 g |
| Dimer Acid | 37.5 g |
| Ammonium hydroxide | 3.0 g |

The 1,2-propanediol, 2-methoxyethanol and dimer acid were mixed at room temperature for ten minutes. The ammonium hydroxide was then added and allowed to stir completely. The sides of the beaker were scraped with a plastic scraper tool to liberate the remaining dimer acid and the solution was stirred for an additional ten minutes.

The resultant electrolyte exhibited a pH of 6.91 and a conductivity of 622 µS/cm at 27.1° C. Water was then added to achieve a Karl Fischer titration (water content) measurement of 1.64%. A pH of 7.15, a conductivity of 819 µS/cm and an open cup scintillation voltage of 546 V were observed at 36.7° C.

Slide capacitors composed of a 1"×5" glass slide sandwich consisting of either a single or a double layer anode interleaved between three 0.25 mil Kraft paper spacers and a conventional cathode (having a cathode-papers-anode(s)-papers-cathode arrangement) were impregnated with the prepared electrolyte. The single anode capacitor exhibited a capacitance of 3.1311 µF, an ESR of 37.96Ω and a breakdown voltage of 621 V. When employed in a dual-anode layer capacitor arrangement, the capacitor obtained a capacitance of 3.9815 µF and an ESR of 125.6Ω. An average viscosity of 11.16 cP and an index of refraction, $n_D$ (20° C.), of 1.4318 were observed for the prepared electrolyte.

Example 8

An electrolyte was prepared having the following formulation:

| | |
|---|---|
| Ethylene Glycol | 494.0 g |
| 2-Butoxyethanol | 112.0 g |
| Dimer Acid | 168.0 g |
| Ammonium hydroxide | 26.0 g |

The ethylene glycol, 2-butoxyethianol and dimer acid were mixed at room temperature and stirred thoroughly. The ammonium hydroxide was then added and allowed to stir completely. The resultant electrolyte exhibited a pH of 7.51 and a conductivity of 2.05 mS at 37° C.

Capacitor sections were prepared by impregnating a paper spacer, separated by aluminum anode and aluminum cathode members, with the electrolyte composition of the example, and the electrolyte composition was evaluated in regard to the aging of the capacitor sections treated with them. The aging procedure involved applying a current of 2 mA per unit in a constant current mode, the maximum voltage applied to these capacitors was 700 V at room temperature. After aging, the units were allowed to cool and stand for 24 hours and the leakage current, capacitance and ESR were determined. The capacitors made from the compositions exhibited a capacitance of 160.92 µF, an ESR of 441.0 mΩ, a leakage current after 1 minute of 1.76 mA and a leakage current after 5 minutes of 1.04 mA.

Example 9

In a similar experiment, an electrolyte was prepared having the following formulation:

| | |
|---|---|
| Ethylene Glycol | 229.2 g |
| 2-Butoxyethanol | 223.0 g |
| Dimer Acid | 154.9 g |
| Ammonium hydroxide | 12.4 g |

The ethylene glycol, 2-butoxyethanol and dimer acid were mixed at room temperature and stirred thoroughly. The ammonium hydroxide was then added and allowed to stir completely. The resultant electrolyte exhibited a conductivity of 0.713 mS at 37° C.

Capacitor sections were prepared by impregnating a paper spacer, separated by aluminum anode and aluminum cathode members, with the electrolyte composition of the example, and the electrolyte composition was evaluated in regard to the aging of the capacitor sections treated with them. The aging procedure involved applying a current of 2 mA per unit in a constant current mode, the maximum voltage applied to these capacitors was 760 V at room temperature. After aging, the units were allowed to cool and stand for 24 hours and the leakage current, capacitance and ESR were determined. The capacitors made from the compositions exhibited a capacitance of 160.29 µF and an ESR of 2.550Ω.

Example 10

An electrolyte was prepared having the following formulation:

| | |
|---|---|
| Di(Ethylene Glycol) | 184.0 g |
| 2-Methoxyethanol | 400.0 g |
| Dimer Acid | 200.0 g |
| Ammonium hydroxide | 16.0 g |

The di(ethylene glycol), 2-methoxyethanol and dimer acid were mixed at room temperature for thirty minutes, until the diner acid dissolved fully. The ammonium hydroxide was then added and allowed to stir completely.

The resultant electrolyte exhibited a pH of 7.26 and a conductivity of 577 µS/cm at 27.4° C. Anhydrous ammonia was then added to the solution. A resultant pH of 8.54 and a conductivity of 1.38 µS/cm were observed at 35.0° C.

Water was then added to achieve a Karl Fischer titration (water content) measurement of 1.53%. A pH of 8.44, a conductivity of 1.42 µS/cm and an open cup scintillation voltage of 518 V were observed at 36.4° C.

Slide capacitors composed of a 1"×3" glass slide sandwich consisting of either a single or a double layer anode interleaved between three 0.25 mil Kraft paper spacers and a conventional cathode (having a cathode-papers-anode(s)-papers-cathode arrangement) were impregnated with the prepared electrolyte. The single anode capacitor exhibited a capacitance of 3.2023 µF, an ESR of 42.52Ω and a breakdown voltage of 640 V. When employed in a dual-anode layer capacitor arrangement, the capacitor obtained a capacitance of 5.2794 µF and an ESR of 99.27Ω. An average viscosity of 16.11 cP and an index of refraction, $n_D$ (20° C.), of 1.4376 were observed for the prepared electrolyte.

Additionally, the electrolyte composition was evaluated in regard to the aging of capacitor sections prepared by impregnating a paper spacer, separated by aluminum anode and aluminum cathode members, with the electrolyte composition of the example. The aging procedure involved applying a current of 2 mA per unit in a constant current mode, the maximum voltage applied to these capacitors was 760 V at room temperature. After aging, the units were allowed to cool and stand for 24 hours and the leakage current, capacitance and ESR were determined. The capacitors made from the compositions exhibited a capacitance of 162.59 µF, an ESR of 981.0 mΩ, a leakage current after 1 minute of 5.01 mA and a leakage current after 5 minutes of 1.69 mA.

Example 11

In a similar experiment, an electrolyte was prepared having the following formulation.

| | |
|---|---|
| Di(Ethylene Glycol) | 184.0 g |
| 2-Methoxyethanol | 400.0 g |
| Dimer Acid | 200.0 g |
| Ammonium hydroxide | 16.0 g |

The di(ethylene glycol), 2-methoxyethanol and dimer acid were mixed at room temperature, until the diner acid dissolved fully. The ammonium hydroxide was then added and allowed to stir completely. The resultant electrolyte exhibited a pH of 7.30 and a conductivity of 0.829 mS at 37° C.

Capacitor sections were prepared by impregnating a paper spacer, separated by aluminum anode and aluminum cathode members, with the electrolyte composition of the example, and the electrolyte composition was evaluated in regard to the aging of the capacitor sections treated with them. The aging procedure involved applying a current of 2 mA per unit in a constant current mode, the maximum voltage applied to these capacitors was 760 V at room temperature. After aging, the units were allowed to cool and stand for 24 hours and the leakage current, capacitance and ESR were determined. The capacitors made from the compositions exhibited a capacitance of 163.18 µF, an ESR of 1.833Ω, a leakage current after 1 minute of 3.92 mA and a leakage current after 5 minutes of 2.90 mA.

Example 12

In a similar experiment, 400 g of the electrolyte prepared in Example 11, above, were mixed with an additional 10 g of ammonium hydroxide and allowed to stir completely. The resultant electrolyte exhibited a pH of 8.60 and a conductivity of 1.74 mS at 37° C.

Capacitor sections were prepared by impregnating a paper spacer, separated by aluminum anode and aluminum cathode members, with the electrolyte composition of the example, and the electrolyte composition was evaluated in regard to the aging of the capacitor sections treated with them. The aging procedure involved applying a current of 2 mA per unit in a constant current mode, the maximum voltage applied to these capacitors was 760 V at room temperature. After aging, the units were allowed to cool and stand for 24 hours and the leakage current, capacitance and ESR were determined. The capacitors made from the compositions exhibited a capacitance of 163.92 µF, an ESR of 776 ml, a leakage current after 1 minute of 10.14 mA and a leakage current after 5 minutes of 4.72 mA.

Example 13

In a similar experiment, an electrolyte was prepared having the following formulation:

| | |
|---|---|
| Di(Ethylene Glycol) | 160.0 g |
| 2-Methoxyethanol | 368.0 g |
| Dimer Acid | 240.0 g |
| Ammonium hydroxide | 32.0 g |

The di(ethylene glycol), 2-methoxyethanol and dimer acid were mixed at room temperature and stirred thoroughly. The ammonium hydroxide was then added and allowed to stir completely. The resultant electrolyte exhibited a pH of 7.87 and a conductivity of 1.563 mS at 37° C.

Capacitor sections were prepared by impregnating a paper spacer, separated by aluminum anode and aluminum cathode members, with the electrolyte composition of the example, and the electrolyte composition was evaluated in regard to the aging of the capacitor sections treated with them. The aging procedure involved applying a current of 2 mA per unit in a constant current mode, the maximum voltage applied to these capacitors was 760 V at room temperature. After aging, the units were allowed to cool and stand for 24 hours and the leakage current, capacitance and ESR were determined. The capacitors made from the compositions exhibited a capacitance of 163.62 µF, an ESR of 781 mΩ, a leakage current after 1 minute of 7.17 mA and a leakage current after 5 minutes of 4.46 mA.

Example 14

In a similar experiment, the concentration of dimer acid in the electrolyte prepared in Example 13, above, was increased from 30% by weight to 35% by weight. The resultant electrolyte exhibited a pH of 7.58 and a conductivity of 1.32 mS at 37° C.

Capacitor sections were prepared by impregnating a paper spacer, separated by aluminum anode and aluminum cathode members, with the electrolyte composition of the example, and the electrolyte composition was evaluated in regard to the aging of the capacitor sections treated with them. The aging procedure involved applying a current of 2 mA per unit in a constant current mode, the maximum voltage applied to these capacitors was 760 V at room temperature. After aging, the units were allowed to cool and stand for 24 hours and the leakage current, capacitance and ESR were determined. The capacitors made from the compositions exhibited a capacitance of 163.33° F., an ESR of 887 mΩ, a leakage current after 1 minute of 5.55 mA and a leakage current after 5 minutes of 3.49 mA.

Example 15

An electrolyte was prepared having the following formulation:

| | |
|---|---|
| Di(Ethylene Glycol) | 184.0 g |
| 2-Methoxyethanol | 382.0 g |
| Dimer Acid | 200.0 g |
| Triethanolamine | 26.0 g |
| Water | 8.0 g |

The di(ethylene glycol), 2-methoxyethanol and dimer acid were mixed at room temperature and stirred thoroughly. The triethanolamine and water were then added and allowed to stir completely. The resultant electrolyte exhibited a pH of 6.74 and a conductivity of 0.324 mS at 37° C.

Capacitor sections were prepared by impregnating a paper spacer, separated by aluminum anode and aluminum cathode members, with the electrolyte composition of the example, and the electrolyte composition was evaluated in regard to the aging of the capacitor sections treated with them. The aging procedure involved applying a current of 2 mA per unit in a constant current mode, the maximum voltage applied to these capacitors was 760 V at room temperature. After aging, the units were allowed to cool and stand for 24 hours and the leakage Current, capacitance and ESR were determined. The capacitors made firm the compositions exhibited a capacitance of 163.53 μF, an ESR of 796 mΩ, a leakage current after 1 minute of 6.09 mA and a leakage current after 5 minutes of 3.51 mA.

Example 16

An electrolyte was prepared having the following formulation:

| | |
|---|---|
| Ethylene Glycol | 12.0 g |
| 2-Ethoxyethanol | 96.0 g |
| Dimer Acid | 37.5 g |
| Ammonium hydroxide | 3.0 g |

The ethylene glycol, 2-ethoxyethanol and dimer acid were mixed in a 200 ml beaker for fifteen minutes. The ammonium hydroxide was then added and allowed to combine thoroughly completely.

The resultant electrolyte exhibited a pH of 6.96 and a conductivity of 295 μS/cm at 27.9° C. Water was then added to achieve a Karl Fischer titration (water content) measurement of 1.90%. A pH of 6.53, a conductivity of 325 μS/cm and an open cup scintillation voltage of 591 V were observed at 37.0° C.

Slide capacitors composed of a 1"×5" glass slide sandwich consisting of either a single or a double layer anode interleaved between three 0.25 mil Kraft paper spacers and a conventional cathode (having a cathode-papers-anode(s)-papers-cathode arrangement) were impregnated with the prepared electrolyte. The single anode capacitor exhibited a capacitance of 2.9123 μF, an ESR of 202.0Ω and a breakdown voltage of 744 V. When employed in a dual-anode layer capacitor arrangement, the capacitor obtained a capacitance of 3.391 μF and an ESR of 271.7Ω. An average viscosity of 8.32 cP and an index of refraction, $n_D$ (20° C.), of 1.4310 were observed for the prepared electrolyte.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents. Additionally, all references cited herein, including journal articles or abstracts, published or corresponding U.S. or foreign patent applications, issued U.S. or foreign patents, or any other references, are each entirely incorporated by reference herein, including all data, tables, figures, and text presented in the cited references.

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

What is claimed is:

1. An electrolyte for use in very high voltage electrolytic capacitors, comprising:
   an alkoxy-substituted alcohol;
   a dicarboxylic acid where the acid functional groups are separated by at least 34 carbons; and
   an amine.

2. An electrolyte according to claim 1, wherein said electrolyte has a breakdown voltage of greater than about 750 V.

3. An electrolyte according to claim 1, wherein said alkoxy-substitute alcohol is 2-methoxyethanol.

4. An electrolyte according to claim 1, wherein said alkoxy-substitute alcohol is 2-ethoxyethanol.

5. An electrolyte according to claim 1, wherein said alkoxy-substitute alcohol is 2-butoxyethanol.

6. An electrolyte according to claim 1, wherein said dicarboxylic acid is dimer acid and the acid functional groups are separated by 34 carbons.

7. An electrolyte according to claim 1, wherein said dicarboxylic acid is trimer acid and the acid functional groups are separated by 54 carbons.

8. An electrolyte according to claim 1, wherein said amine is selected from the group consisting of ammonia, dimethylamine, trimethylamine, diethylamine, triethylamine, ethanolamine, diethanolamine, triethanolamine, diisopropylethylamine and N-methylimidazole.

9. An electrolyte according to claim 1, wherein said amine is ammonium hydroxide.

10. An electrolyte according to claim 1, comprising about 30.0% to about 80.0% by weight of an alkoxy-substituted alcohol, about 5.0% to about 40.0% by weight of a dicarboxylic acid where the acid functional groups are separated by at least 34 carbons, and not more than about 6.0% by weight of an amine.

11. An electrolyte according to claim 1, comprising about 35.0% to about 75.0% by weight of an alkoxy-substituted alcohol, about 20.0% to about 35% by weight of a dicarboxylic acid where the acid functional groups are separated by at least 34 carbons and about 2.0% to about 4.0% by weight of an amine.

12. An electrolyte according to claim 1, further comprising a cosolvent.

13. An electrolyte according to claim 12, wherein said cosolvent is selected from the group consisting of ethylene glycol, 1,2-propanediol, 1,3-butanediol, 1,4-butanediol, di(ethylene glycol), tri(ethylene glycol), tetra(ethylene glycol), propyl alcohol, isopropyl alcohol, n-butanol, and di(ethylene glycol) butyl ether.

14. An electrolyte according to claim 12, comprising about 30.0% to about 80.0% by weight of an alkoxy-substituted alcohol, not more than about 50.0% by weight of a cosolvent, about 5.0% to about 40.0% by weight of a dicarboxylic acid where the acid functional groups are separated by at least 34 carbons, and about not more than about 6.0% by weight of an amine.

15. An electrolyte according to claim 12, comprising about 35.0% to about 75.0% by weight of an alkoxy-substituted alcohol, about 5.0% to about 40.0% by weight of a cosolvent, about 20.0% to about 35% by weight of a dicarboxylic acid where the acid functional groups are separated by at least 34 carbons and about 2.0% to about 4.0% by weight of an amine.

16. An electrolyte according to claim 1, further comprising a cathode depolarizer.

17. An electrolyte according to claim 16, wherein said cathode depolarizer is a nitro-substitute aromatic compound.

18. An electrolyte according to claim 17, wherein said nitro-substituted aromatic compound is selected from the group consisting of:
nitrobenzene, nitrotoluene, nitrophenol, nitroacetophenone, nitrobenzyl alcohol and nitroanisole.

19. An electrolyte according to claim 1, further comprising water.

20. An electrolyte according to claim 19, comprising not more than about 8.0% by weight water.

21. An electrolyte for use in very high voltage electrolytic capacitors, comprising 2-methoxyethanol, di(ethylene glycol), dimer acid and ammonium hydroxide.

22. An electrolyte according to claim 21, comprising about 30.0% to about 80.0% by weight 2-methoxyethanol, not more than about 50.0% by weight di(ethylene glycol), about 5.0% to about 40.0% by weight dimer acid, and not more than about 6.0% by weight ammonium hydroxide.

23. An electrolyte according to claim 21, comprising about 35.0% to about 75.0% by weight 2-methoxyethanol, about 5.0% to about 40.0% by weight di(ethylene glycol), about 20.0% to about 35% by weight dimer acid and about 2.0% to about 4.0% by weight ammonium hydroxide.

24. An electrolyte according to claim 21, comprising 50.0% by weight 2-methoxyethanol, 23.0% by weight di(ethylene glycol), 25.0% by weight dimer acid and 2.0% by weight ammonium hydroxide.

25. An electrolytic capacitor impregnated with the electrolyte of claim 1.

26. An electrolytic capacitor impregnated with the electrolyte of claim 21.

27. An implantable cardioverter defibrillator comprising an electrolytic capacitor impregnated with the electrolyte of claim 1.

28. An implantable cardioverter defibrillator comprising an electrolytic capacitor impregnated with the electrolyte of claim 21.

* * * * *